(12) United States Patent
Miller (10) Patent No.: US 6,229,542 B1
(45) Date of Patent: May 8, 2001

(54) METHOD AND APPARATUS FOR MANAGING WINDOWS IN THREE DIMENSIONS IN A TWO DIMENSIONAL WINDOWING SYSTEM

(75) Inventor: John David Miller, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/113,814

(22) Filed: Jul. 10, 1998

(51) Int. Cl.[7] .................................................... G06F 3/00
(52) U.S. Cl. ............................ 345/358; 345/355; 345/343
(58) Field of Search .................................... 345/339, 340, 345/342, 343, 344, 345, 348, 355, 358, 976, 977, 419, 425, 430, 433, 435, 438, 439, 473

(56) References Cited

U.S. PATENT DOCUMENTS

| | | | |
|---|---|---|---|
| 4,555,775 | | 11/1985 | Pike ....................................... 345/344 |
| 5,303,388 | * | 4/1994 | Kreitman et al. ...................... 345/348 |
| 5,555,354 | * | 9/1996 | Strasnick et al. ..................... 345/427 |
| 5,678,015 | * | 10/1997 | Goh ........................................ 345/340 |
| 5,689,628 | * | 11/1997 | Robertson ............................. 345/427 |
| 5,724,492 | * | 3/1998 | Matthews, III et al. ............. 345/419 |
| 5,745,109 | * | 4/1998 | Nakano et al. ....................... 345/340 |
| 5,754,809 | * | 5/1998 | Gandre ................................. 345/343 |
| 5,774,125 | * | 6/1998 | Suzuoki et al. ...................... 345/430 |
| 5,835,094 | * | 11/1998 | Ermel et al. .......................... 345/355 |
| 5,838,326 | * | 11/1998 | Card et al. ........................... 345/355 |
| 5,880,733 | * | 3/1999 | Horvitz et al. ....................... 345/355 |
| 5,990,900 | * | 11/1999 | Seago ................................... 345/427 |
| 6,081,270 | * | 6/2000 | Berry et al. .......................... 345/419 |

OTHER PUBLICATIONS

Card, Stuart K. et al., "The WebBook and the Web Forager: An Information Workspace for the World–Wide Web", CHI 96 Conference on Human Factors in Computing Systems, Apr. 13–18, 1996, pp. 111–117.

* cited by examiner

Primary Examiner—Crescelle N. dela Torre
(74) Attorney, Agent, or Firm—Steven P. Skabrat (57) ABSTRACT

Managing windows in a graphical user interface by receiving a signal indicating a gesture from a user, capturing pixels of a window, applying the captured pixels as a texture to a display object in a three dimensional window, and animating the display object to a first location in the three dimensional window corresponding to the window, when the gesture indicates deactivating the window. Further actions include moving the display object to a second location in the three dimensional window, displaying the window over the display object, and hiding the display object, when the gesture indicates activating the window.

25 Claims, 8 Drawing Sheets

METHOD AND APPARATUS FOR MANAGING WINDOWS IN THREE DIMENSIONS IN A TWO DIMENSIONAL WINDOWING SYSTEM

BACKGROUND

1. Field

The present invention relates generally to graphical user interfaces in computer systems and more specifically to a generalized three dimensional graphical user interface.

2. Prior Art

Windowing systems are commonly used in graphical user interfaces of modern computer systems. The use of windows solves the problem of simultaneously representing more than one set of display output data from one or more application programs on a single computer monitor. The windowing solution typically allocates at least one display window on the computer screen for each executing application program and allows the user to resize and move the windows as desired. The operating system (OS) software of the computer system manages the resulting lists of possibly overlapping rectangular windows, thereby allowing application programs to draw on the portions of their windows that are visible (e.g., not obscured or clipped by the screen extents or other windows). The OS typically notifies application programs when portions of their windows become exposed and need to be repainted or redrawn. In some cases, application programs may request that a window manager program within the OS handle these events directly from an off-screen memory buffer either in whole (by having the application program draw directly to the off-screen memory buffer instead of the window, either for the whole window or only for the obscured portion), or in part (as when the window manager "pops up" a menu—the contents under the area to be destroyed are saved into off-screen memory so that it can be quickly restored after the menu is closed).

The windowing system manages the precious resource of screen space by manipulating a two and one half dimensional space. The space has dimensions of horizontal and vertical coordinates, as well as an order for overlapping windows. Windows are objects in this space. The windowing system maintains state information about these objects, including their position, extents, and sometimes even their contents.

Figure 1:
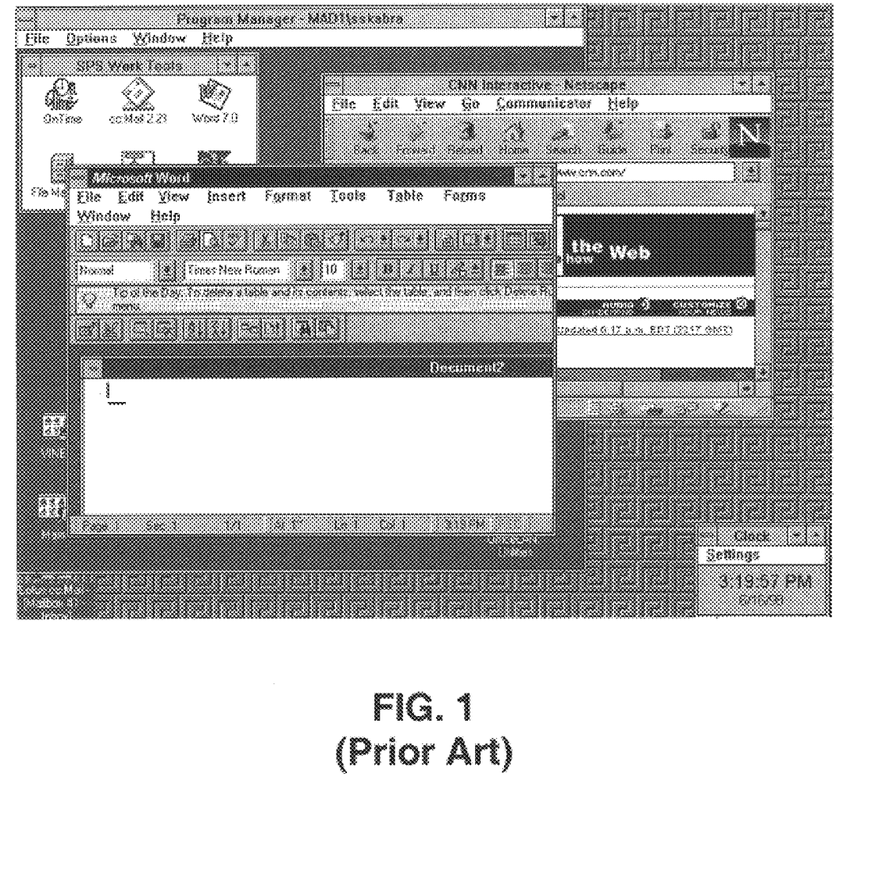
FIG. 1 is a diagram of an example display screen from a prior art windowing system.

As the number of windowing application programs grew, so did the number of windows likely to be shown on a user's screen at any given time. Icons, first developed as a way of launching applications, were later employed to represent running application program windows. These so-called "minimized" or "iconified" windows are temporarily replaced visually with very small (typically 32 by 32 pixels) images. FIG. 1 is an example diagram of a prior art windowing system showing the use of icons, a background or "desktop" window, and multiple overlapping windows. In current windowing systems such as WINDOWS95™, for example, commercially available from Microsoft Corporation, icons typically represent the application program rather than a document or file, but other systems may also use selected images generally as icons (called "picture icons" or "picons").

Useful as icons are at simplifying the look of the computer display, they have a disadvantage of being a discretely different representation of the windows they represent, with the cognitive mapping between the icons and the windows left to the user. In addition, when multiple windows are shown on a screen, the user may have trouble managing their use. Interaction with many windows in a single session of using the computer system may be cumbersome, confusing and slow. The well known metaphor of the desktop window and icons representing minimized application windows may be improved upon to provide a more elegant and efficient mechanism for interacting with a windowing system.

SUMMARY

An embodiment of the present invention is a method of managing windows. The method comprises receiving a signal indicating a gesture from a user, capturing pixels of a window, and applying the captured pixels as a texture to a display object located at a first location corresponding to the window in a three dimensional window, when the gesture indicates deactivating the window. The method further comprises moving the display object to a second location in the three dimensional window and displaying the window over the display object when the gesture indicates activating the window.

Another embodiment of the present invention is a method of displaying a representation of deactivating a window. The method comprises capturing pixels of the window and applying the captured pixels as a texture to a display object in a three dimensional window.

Another embodiment of the present invention is a method of displaying a representation of activating a window. The method comprises moving and orienting a display object to a location in a three dimensional window, and displaying the window over the display object in the three dimensional window.

BRIEF DESCRIPTION OF THE DRAWINGS

The features and advantages of the present invention will become apparent from the following detailed description of the present invention in which.

DETAILED DESCRIPTION

In the following description, various aspects of the present invention will be described. For purposes of explanation, specific numbers, systems and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 2:
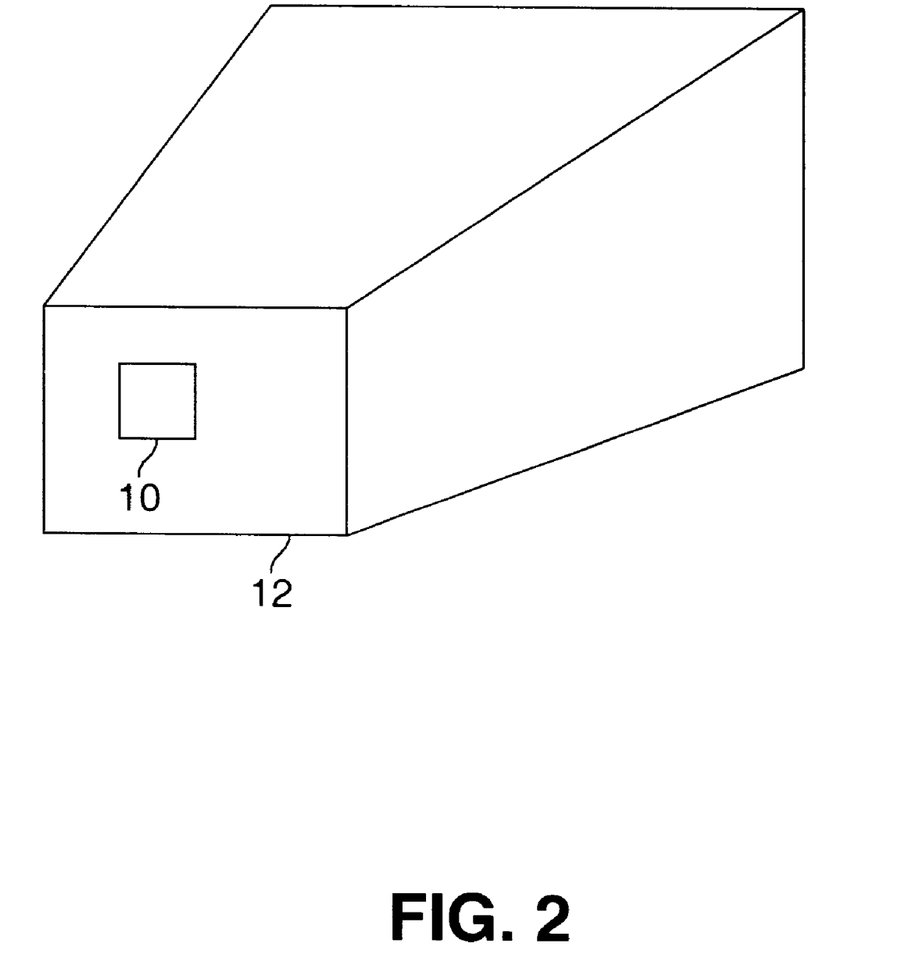
FIG. 2 is a diagram of a three dimensional (3D) graphics perspective projection frustrum with a 2D window aligned with the projection plane.
Figure 3:
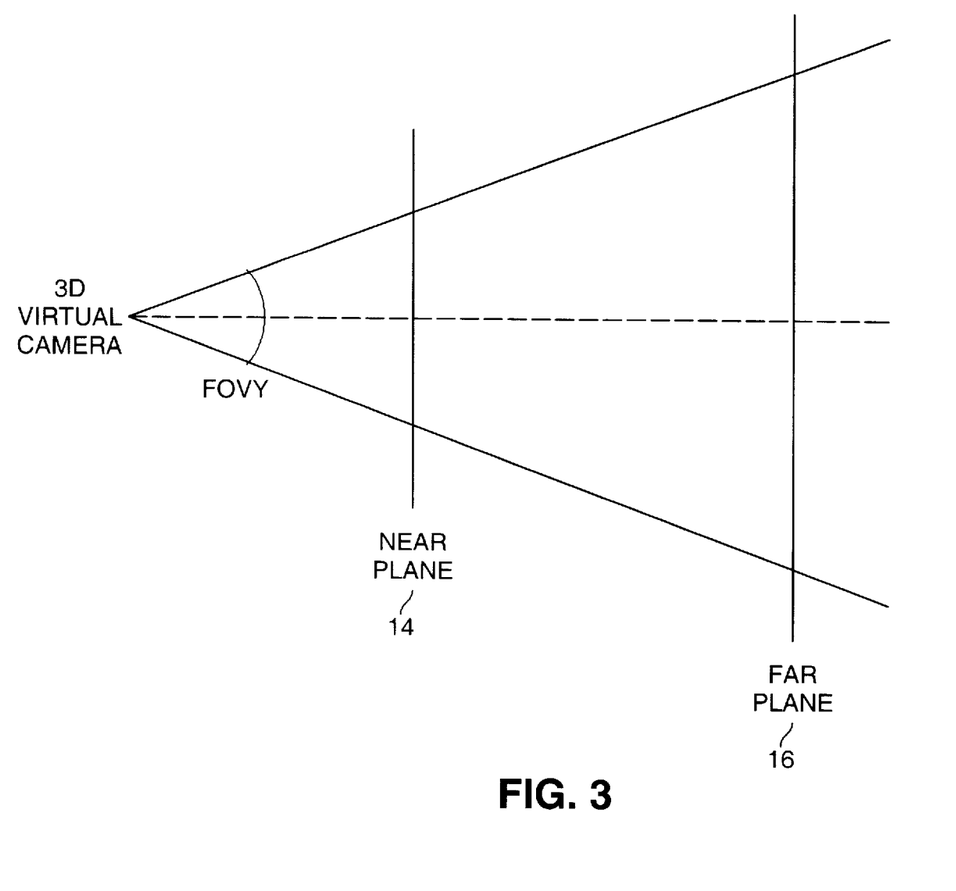
FIG. 3 is a side view of a perspective viewing volume.

An embodiment of the invention improves windowing systems by extending the representation of a window to include true depth (i.e., three spatial dimensions as opposed to two dimensions plus an overlapping order). This depth dimension addresses the window overcrowding problem by allowing windows to be positioned and arranged within a true three dimensional (3D) space. Because of "perspective foreshadowing", objects appear visually smaller when they are further away, and these smaller shapes occupy fewer pixels on the screen. In addition, 3D display objects can be rotated or otherwise viewed off-axis, which also occupy less space on the screen. FIG. 2 is a diagram of a 3D graphics perspective projection frustrum with a 2D window aligned with the projection plane. When a window such as 2D window 10, for example, is shown in the foreground of the 3D space, it appears on projection plane 11. FIG. 3 is a side view of a perspective viewing volume. When a window is shown in the background of the 3D space, an embodiment of the present invention provides the illusion to the user that the window resides somewhere between the near plane 14 and the far plane 16.

An embodiment of the present invention manages the transition between the 2D window state and the 3D window state to exhibit a 3D representation of traditional 2D windows, without modification of existing application programs. More generally, an embodiment of the present invention is a method for managing two dimensional (2D) windows in a true three dimensional (3D) graphical space, all within a 2D windowing system. In an embodiment of the present invention, the 3D space is maintained behind other active 2D windows, much like a traditional 2D desktop image. In this way, 2D windows may be "pushed back" by a user into the 3D desktop image by transforming the pixels of the 2D windows onto similarly shaped 3D display objects in the 3D desktop image. When a 2D window is brought to the foreground as a result of user interaction, the 2D window's corresponding 3D display object in the 3D desktop image may be oriented such that the actual 2D window is positioned over the top of the 3D display object, thereby giving the illusion that the 2D window actually exists in the 3D space. As used herein, the term "foreground" means a location appearing to the user to be in the front of the three dimensional viewing space on a display (that is, close to the near plane), and the term "background" means a location appearing to the user to be towards the back of the three dimensional viewing space on the display (that is, farther away from the near plane of the display in a direction away from the user).

Figure 4:
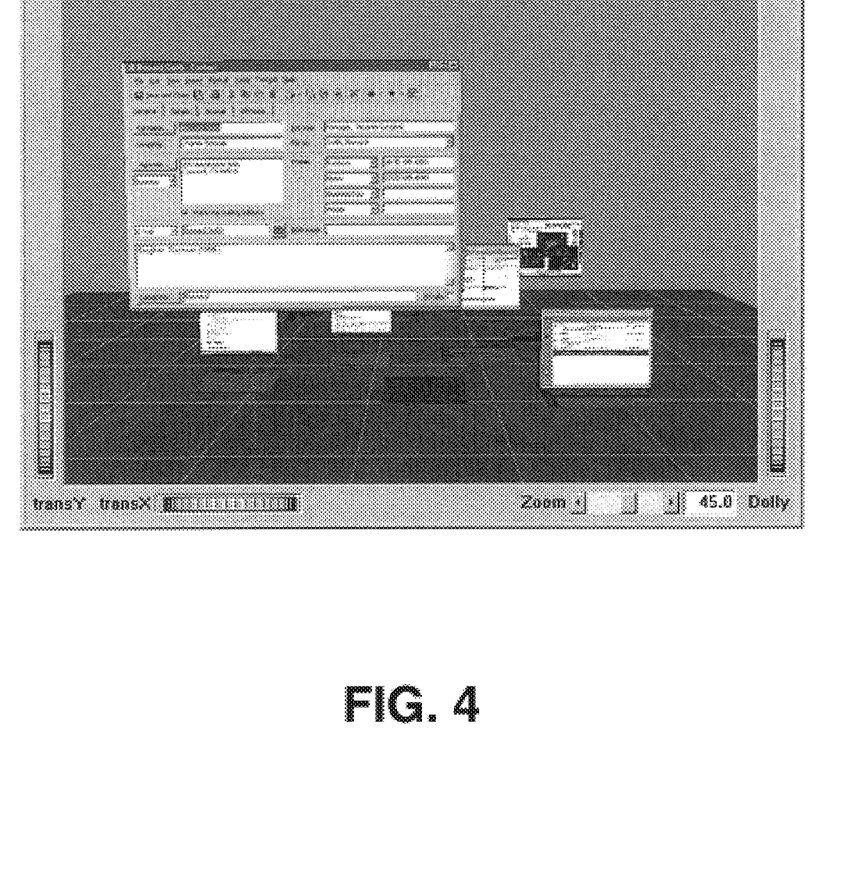
FIG. 4 is a diagram of a first example of 2D windows texture-mapped onto window-shaped objects in a 3D space according to an embodiment of the present invention.

FIG. 4 is a diagram of a first example of 2D windows texture-mapped onto window-shaped objects in a 3D space according to an embodiment of the present invention. Note that 3D graphics are rendered onto a 2D surface (i.e., a 3D desktop window). This 2D surface may be used to replace the traditional background desktop window in graphical user interfaces (GUIs) such as is provided, for example, by the WINDOWS95™, WINDOWS98™, or WINDOWS NT® operating systems commercially available from Microsoft Corporation. A window 50 is shown as being active by its representation in the foreground of the 3D desktop window 52. Other windows 54, 56 are currently shown as inactive by their representation in the background of the 3D desktop window. These inactive windows are represented by smaller images in the 3D desktop window than if they were currently active. A bottom surface 58 may be represented in the 3D desktop window to provide a horizon line and to provide additional visual cues to the user for promoting the 3D illusion. The bottom surface optionally may include grid lines.

Figure 5:
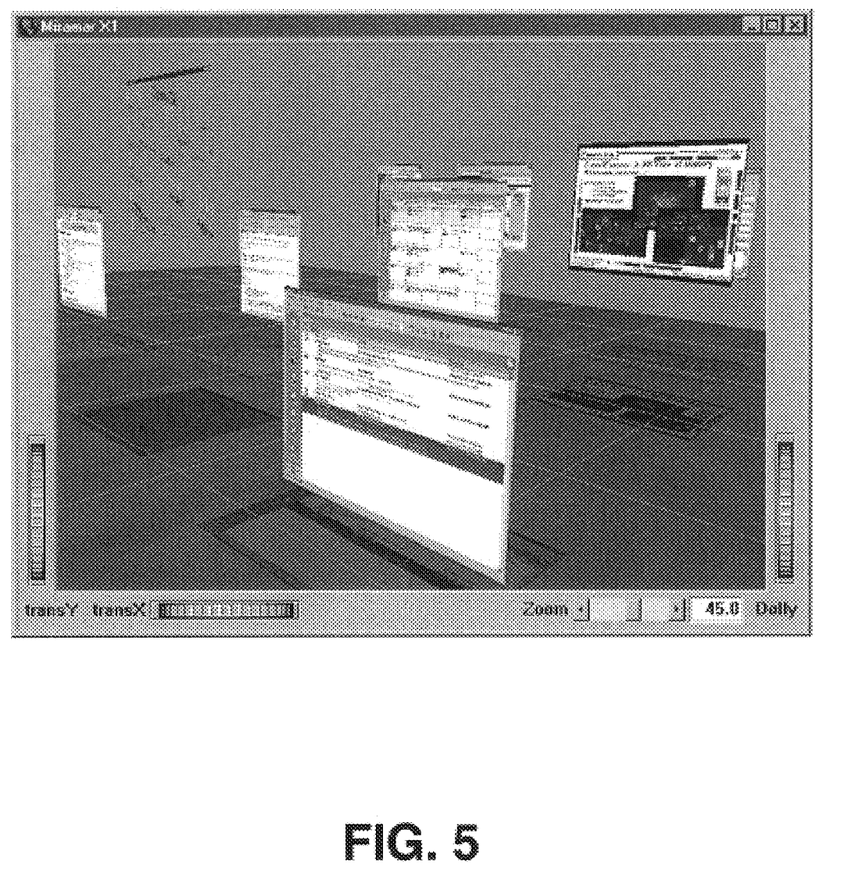
FIG. 5 is a diagram of a second example of 2D windows texture-mapped onto window-shaped objects in a 3D space according to an embodiment of the present invention.

FIG. 5 is a diagram of a second example of 2D windows texture-mapped onto window-shaped objects in a 3D space according to an embodiment of the present invention. From this vantage point, the illusion of a 3D image is more perceptible to the user. In one embodiment, false shadows 60, 62 may be represented on the bottom surface 58 in the 3D desktop window. This permits windows to be selected by their shadows even when the windows themselves may be obscured by other windows.

Using three dimensions to manage 2D objects according to an embodiment of the present invention provides at least several advantages. The user is provided with more space on his or her virtual desktop upon which to manipulate multiple application program windows. Windows may be pushed back into 3D space in full resolution when they are not currently being used. The user is provided with a better context regarding inactive windows. Instead of displaying small icons with a minimal amount of identifying information or symbols as is currently done by graphical user interfaces such as is implemented in WINDOWS™, with embodiments of the present invention background application windows retain their appearance in a 3D space. In an alternate embodiment of the present invention, the "pushed" back windows may be implemented as being fully active despite being in the background of the 3D desktop window. Therefore, the ability to integrate true 3D objects into the computer user's workspace is provided. In past systems, 3D objects were drawn in 2D windows. The present invention displays 2D objects in a 3D space, where other 3D objects may also reside. Anecdotal evidence suggests that users prefer a 3D display environment over a complicated 2D display environment having many overlapping windows. The 3D desktop window of the present invention provides a more natural and intuitive graphical user interface than the traditional 2D desktop interface.

Figure 6:
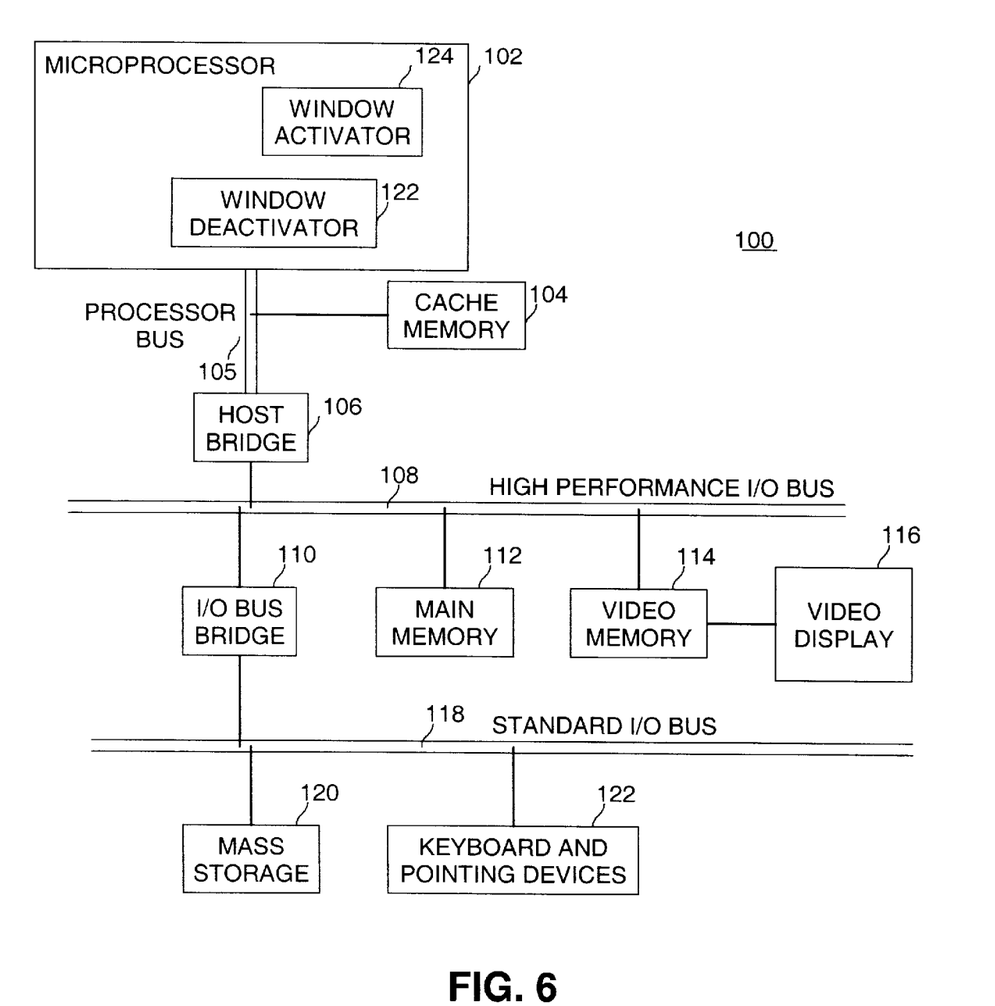
FIG. 6 is a diagram illustrating a sample computer system suitable to be programmed according to an embodiment of a method for managing windows in 3D within a 2D windowing system in accordance with the present invention.

FIG. 6 is a diagram illustrating a sample computer system suitable to be programmed according to an embodiment of a method for managing windows in 3D within a 2D windowing system in accordance with the present invention. Sample system 100 may be used, for example, to execute the processing for the methods described herein. Sample system 100 is representative of computer systems based on the PENTIUM®, PENTIUM® Pro, and PENTIUM® II microprocessors available from Intel Corporation, although other systems (including personal computers (PCs) having other microprocessors, engineering workstations, set-top boxes and the like) may also be used. In one embodiment, sample system 100 may be executing a version of the WINDOWS™ operating system available from Microsoft Corporation, although other operating systems and graphical user interfaces may also be used. Sample system 100 includes microprocessor 102 and cache memory 104 coupled to each other through processor bus 105. Sample system 100 also includes high performance I/O bus 108 and standard I/O bus 118. Processor bus 105 and high performance I/O bus 108 are bridged by host bridge 106, whereas high performance I/O bus 108 and standard I/O bus 118 are bridged by I/O bus bridge 110. Coupled to high performance I/O bus 108 are main memory 112 and video memory 114. Coupled to video memory 114 is video display 116. Coupled to standard I/O bus 118 are mass storage 120, and keyboard and pointing devices 122. Mass storage 120 may comprise, for example, a hard disk drive, a floppy disk drive, a CD-ROM device, a flash memory device, or other storage device. Mass storage may comprise one or a plurality of the described data storage devices.

These elements perform their conventional functions well-known in the art. In particular, mass storage 120 may be used to provide long-term storage for the executable instructions for embodiments of methods for managing windows in accordance with the present invention, whereas main memory 112 is used to store on a shorter term basis the executable instructions of embodiments of the methods for managing windows in accordance with the present invention during execution by microprocessor 102. Window deactivator 122 represents a set of instructions, which when executed by the microprocessor, deactivate a selected window. Window activator 124 represents a set of instructions, which when executed by the microprocessor, activate a previously deactivated window.

In conventional 2½D windowing systems having horizontal, vertical, and window overlapping parameters, the user is typically given a number of ways in which the user can direct the state transition of a window from "normal" to "iconified" and back. In user-interface design parlance, these "gestures" might include double-clicking on an item, clicking an on-screen button, selecting an item from an on-screen menu, typing keystrokes, etc. Whatever the gesture, the window system (or the window manager, in more modular implementations such as the well known X Window System) may interpret this action as a state-transition event.

In the "iconifying" case, the 2½D window system typically "hides" the normal window (e.g., removes it in some way from the current display), optionally animates a shrinking outline of the window towards the icon position, and displays the icon on the "desktop" window. The desktop window is typically owned by the window system/window manager and exists specifically for this purpose. Application program icons are typically defined by the application program. The window system may also define icons. The window system also typically sends a message to the application program that owns the window notifying the application program of the state change.

In the "restoring" case, the 2½D window system typically hides the icon, optionally animates an expanding 2D outline of the window towards the window position, and displays the application program window. The window system also typically notifies the application program of the state change, and notifies the application program that its window needs to be redrawn. In some systems, the application program or window system may redraw the window contents from an off-screen bitmap image buffer that preserved the contents of the window before it was iconified or even from an off-screen bitmap image buffer that allowed the application to draw to it even while the window was iconified.

In either the iconifying or restoring case, processing is as follows. The user or application program indicates its desire to change the state of a window from "normal" to "iconified" or from "iconified" to "normal." The window system (or, in some implementations, the window manager) effects this state change by hiding and showing the appropriate representations, optionally providing some cues (e.g., animation) to visually link the two. The window system notifies the window owner (i.e., application program) of the state change. With most window systems, a transition from iconic to normal also brings about a notice to redraw the window contents. One embodiment of the present invention is an extension to this processing model to provide 3D windows by implementation as an integral part of a window system and/or window manager, such as, for example, in a version of the WINDOWS™ window system, although the invention is not limited in this respect.

Traditional window systems maintain information for each window, including the window's owner, position, size, style, and sometimes even the pixel contents. As mentioned above, top-level application windows also have an iconic alter ego that may also be a part of the window representation. An embodiment of the present invention extends this state information for a window with at least five additional attributes. These attributes include a 3D shape or "geometry" model, the same or similar shape and relative size as the 2D window; the pixel contents of the 2D shape, applied to the 3D shape as a "texture"; a position in the 3D space; an orientation in the 3D space; and a transition state. In one embodiment, the transition state may be one of {inForeground, inBackground, movingToBackground, movingToForeground}. Like the relationship between icons and normal windows, the objects in an embodiment of the present invention are either in one state (e.g., 2D) or the other (e.g., 3D). The animating states "movingToBackground" and "movingToForeground" are transitory states that may be optional, but important, like the animating states for icons. When a window "isForeground", it behaves as in traditional windowing systems. When a window "isBackground", the window exists as an object in a 3D space, where it may be positioned, rotated, or otherwise manipulated, much like dragging icons around a traditional 2½D window system.

As discussed above, traditional window systems are considered to be 2½ dimensional. That is, windows have horizontal and vertical dimensions, positions within a coordinate system, and a "stacking" order, which indicates their layering precedence. There are really two coordinate spaces available to the window owner, the screen space and the "client" space, which is offset by the origin of the window within the screen space. In any case, 2½D windows are like sheets of paper that are always parallel to the screen. In contrast, an embodiment of the present invention complements the 2½D space with a true, three-dimensional space that effectively replaces the flat 2D "desktop" window and 2D icons. Whereas 2½D icons are arranged on top of a flat, 2D desktop window, an embodiment of the present invention provides an environment where 3D window representations may be arranged within a 3D desktop space.

When 3D windows according to an embodiment of the present invention are in the "foreground," they obey all the rules of the 2½D window system, including position and stacking order. Windows in the "background" are true 3D objects and obey all the rules of a 3D space, as practiced in the art of 3D graphics.

Note that "true 3D space" is actually a mathematically true space. The present invention does not give real, physical depth to a screen of a computer monitor. In well known 3D computer graphics, 3D geometric models are projected onto the flat screen similar to the way that light is projected onto camera film. This results in a two-dimensional image of a three-dimensional scene being represented on the monitor. An embodiment of the present invention provides flat 2D windows with 3D characteristics by creating 3D models out of 2D windows, and seamlessly joining the 2D and 3D environments to provide the illusion that the 2D window is really a 3D object in a 3D world.

Figure 7:
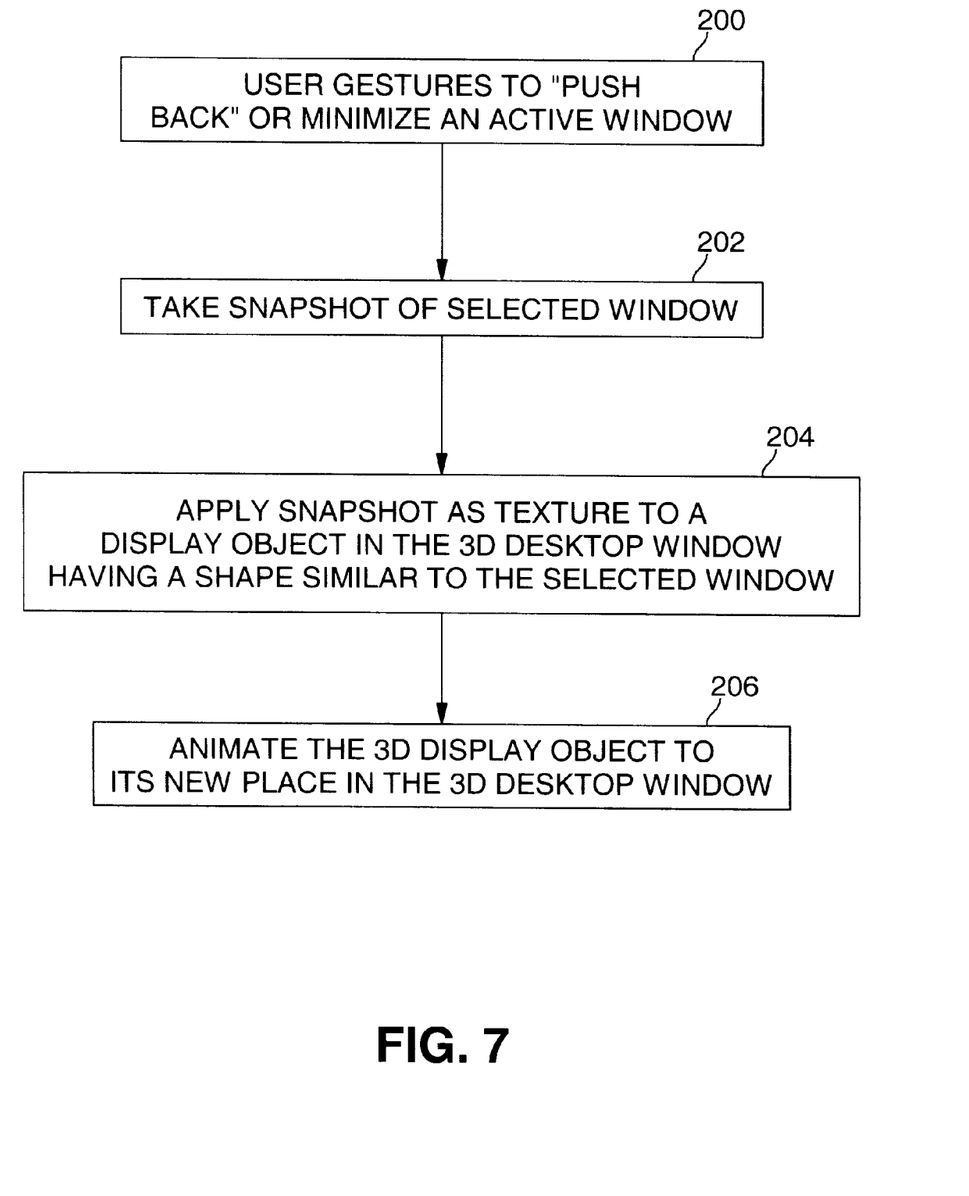
FIG. 7 is a flow diagram of pushing a window back from 2D space into a 3D space according to an embodiment of the present invention.

FIG. 7 is a flow diagram of pushing a window back from 2D space into a 3D space according to an embodiment of the present invention. At block 200, the user gestures to "push back", deactivate, or minimize a currently active window by sending at least one input signal to the graphical user interface. This action may comprise one or more keyboard entries (such as an ALT-TAB key combination, for example), or one or more mouse clicks, or any other user actions recognized by the system, which are interpreted by the GUI as input signals to deactivate or close a selected window. At block 202, a "snapshot" of the selected window is taken. That is, the pixels making up the selected window to be pushed back are captured in a data structure by the graphical user interface. At block 204, the snapshot data as a texture is applied to a display object in the 3D desktop window having the same shape as the selected window. At block 206, the 3D display object is animated to its new place in the 3D desktop window corresponding to the deactivated 2D window. The new location in the 3D desktop window may be in the background of the 3D space, thereby indicating that the selected window is inactive.

Figure 8:
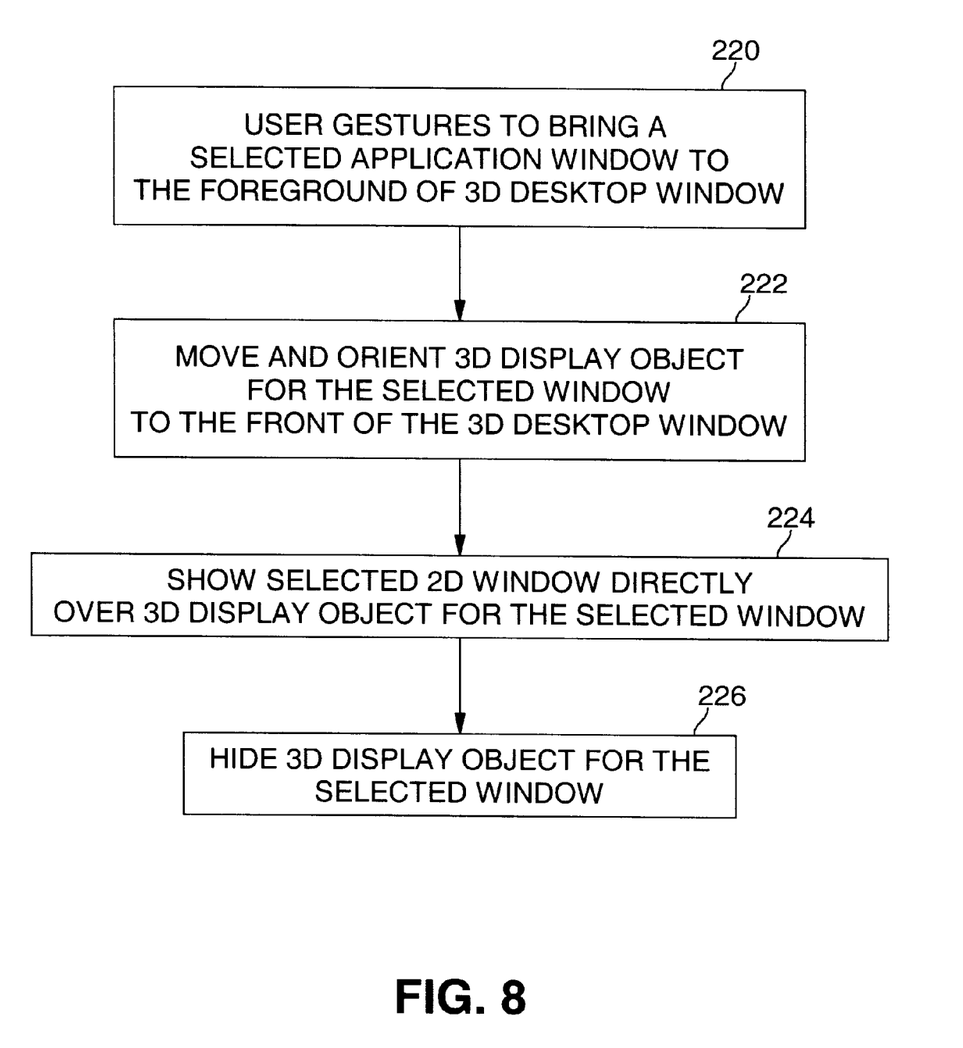
FIG. 8 is a flow diagram of bringing a window forward from the 3D space to 2D space according to an embodiment of the present invention.

FIG. 8 is a flow diagram of bringing a window forward from the 3D space to 2D space according to an embodiment of the present invention. At block 220, the user gestures to bring a selected window to the foreground of the 3D desktop window, by sending at least one input signal to the graphical user interface. This action may comprise one or more keyboard entries (such as an ALT-TAB key combination, for example), or one or more mouse clicks, or any other user actions recognized by the system, which are interpreted by the GUI as input signals to activate or bring a selected window to the foreground of the 3D desktop window. At block 222, the 3D display object representing the selected window is moved and oriented to appear in the foreground or front of the 3D desktop window. At block 224, a 2D window representing the selected window is shown directly over the 3D display object. At block 226, the 3D display object for the selected window is hidden from current display on the 3D desktop window.

In one embodiment, the "push to back" operation may be defined as a "SendToBack" or "iconify" method comprising the following operations. If the 3D display object (i.e., geometry) for a selected 2D window does not currently exist, then a flat rectangular 3D object (e.g., a "face") may be created in the same shape and relative size as the 2D window, and the background position and rotation may be initialized to nominal values. Next, the current pixel contents of the 2D window may be saved to an off-screen bitmap image buffer (known as a "bitblt" operation). The saved pixel contents may be saved as a texture onto the 3D geometry, optionally scaling the image down or otherwise creating alternate scale images (e.g. "mipmapping") as is well-known to those skilled in the current 3D graphics art.

The current, "foreground" position of the 2D window in 3D space may then be computed and stored. That is, the position and rotation of the alter ego 3D display object may be computed such that the 3D object is oriented parallel to the screen (and thus, the 2D window) and is positioned directly underneath the 2D window at a distance that presents the 3D object at exactly the same size as the 2D window. This may be accomplished by the following operations. The 2D screen-space coordinates (origin and extents) of the 2D window may be obtained. These coordinates may be translated into the client-space coordinates of the 3D window. The 3D object may be resized to match the aspect ratio (width/height) and relative size of the 2D window. The rotation of the 3D object may be set to be perpendicular to the 3D virtual camera's line of sight, with the front of the object facing the virtual camera. The position of the 3D object may be such that its distance from the camera effects a visual shape that is the same size as the 2D window. This is solved using well-known trigonometry as practiced in the art of 3D graphics programming. The parameters of the 3D perspective frustum (as shown in FIG. 2) specify a viewing angle (called the fovy, the angle from the top of the frustum to the bottom) and aspect ratio (width/height). The frustum may be bisected top-to-bottom to produce right triangles with respect to the Y- and the Z-axis. Basic trigonometry enables one to compute the required distance of the 3D display object: taking the trivial case of the object centered around the line of sight, the tangent of ½fovy=½ object_ height/distance, wherein tan(theta)=opposite/adjacent. The camera-relative XY placement of the 3D display object may be adjusted to affect the placement of the 2D window relative to the 2D screen.

With the 3D display object now positioned, oriented, and sized in a similar manner to its 2D counterpart, the 2D window may now be hidden from view, leaving a visually equivalent 3D representation where the 2D window used to be. In some embodiments, the 2D window may actually be "hidden" or otherwise removed from the list of actively displayed windows. In other embodiments, the 2D window may be hidden from view by allowing the 3D graphics window, usually sized to the full extent of the screen, to be placed before the 2D window in the stacking order, thus obscuring the 2D window.

The 3D object may be animated to its 3D position and rotation using methods well known in the 3D graphics programming art. Typically, this involves adjusting the position and rotation in small increments over time. In one embodiment of the present invention, a timer may be used to affect the animation changes at a rate of approximately 10–30 frames per second, for example. At each frame, the current time may be examined to determine the percentage of time that has elapsed between the start of the animation and the end of animation. This percentage may be used to interpolate, either linearly or according to some non-linear function (e.g., slow-in/slow-out) the current, instantaneous position and rotation of the 3D display object. The resultant values may then be set on the 3D display object, according to methods well known in the art.

In one embodiment, the restore to front operation may be implemented as a "BringToFront" or "restore" method. The 3D display object may be animated to the foreground position. The 2D window may be shown at its previous size and location. In embodiments where the window was actually hidden when sent to the background, the window may now be restored to its normal state. In one embodiment, the stacking order of the window may be adjusted to put it at the top, in front of the 3D desktop window. The 3D display object may then be hidden, according to methods well known in the 3D graphics programming art.

In some 2D window systems it may be possible and desirable to actually replace the conventional 2D desktop window with the 3D window of an embodiment of the present invention. In this case, application program windows will need to be "hidden" and "shown", or otherwise removed from and added to the operating system's active window list. In an embodiment where the 3D desktop window behaves as other application program windows, the hiding and showing operations are accomplished by obscuring and revealing the 2D window through adjustment of the 2D window stacking order. With the 3D desktop window sized to the full screen extent, the 3D window acts like a curtain or backdrop on a stage. Normal 2D application program windows behind the 3D desktop window are not visible to the user.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of managing windows comprising:

receiving a signal indicating a gesture from a user;

when the gesture indicates deactivating a window, capturing pixels of the window and applying the captured pixels as a texture to a display object corresponding to the window, the display object being a three dimensional geometric model located at a first location in a three dimensional space, and when the gesture indicates activating the window, moving the display object to a second location in the three dimensional space and displaying the window over the display object, thereby hiding the display object from view by the user.

2. The method of claim 1, further comprising animating the display object to the first location in the three dimensional space when the gesture indicates deactivating the window.

3. The method of claim 2, wherein animating the display object comprises rendering the display object at a plurality of locations within the three dimensional space.

4. The method of claim 1, wherein the window comprises a two dimensional window.

5. The method of claim 1, wherein the three dimensional space comprises a two dimensional image of a three dimensional scene represented on a display.

6. The method of claim 1, further comprising displaying the three dimensional space as a desktop window in the foreground of a display.

7. The method of claim 1, wherein the first location comprises a background location within the three dimensional space and the second location comprises a foreground location within the three dimensional space.

8. The method of claim 1, wherein the display object has a shape similar to the window.

9. The method of claim 1, further comprising hiding the display object when the gesture indicates activating the window.

10. The method of claim 1, wherein moving the display object comprises orienting the display object within the three dimensional space.

11. An article comprising a machine readable medium having a plurality of machine readable instructions, wherein when the instructions are executed by a processor the instructions cause a system to receive a signal indicating a gesture from a user; when the gesture indicates deactivating a window, to capture pixels of the window and to apply the captured pixels as a texture to a display object corresponding to the window, the display object being a three dimensional geometric model located at a first location in a three dimensional space; and, when the gesture indicates activating the window, to move the display object to a second location in the three dimensional space and to display the window over the display object, thereby hiding the display object from view by the user.

12. The article of claim 11, further comprising instructions to animate the display object to the first location in the three dimensional space when the gesture indicates deactivating the window.

13. The article of claim 11, further comprising instructions to hide the display object when the gesture indicates activating the window.

14. The article of claim 11, wherein the three dimensional space comprises a two dimensional image of a three dimensional scene represented on a display.

15. The article of claim 11, further comprising instructions to display the three dimensional space as a desktop window in the foreground of a display.

16. The article of claim 11, wherein the first location comprises a background location within the three dimensional space and the second location comprises a foreground location within the three dimensional space.

17. A system for managing windows in a graphical user interface comprising:

means for deactivating a window, the deactivating means comprising means for capturing pixels of the window, means for applying the captured pixels as a texture to a display object in a three dimensional space, the display object being a three dimensional geometric model corresponding to the window, and means for animating the display object to a first location in the three dimensional space; and means for activating the window, the activating means comprising means for moving the display object to a second location in the three dimensional space, and means for displaying the window over the display object thereby hiding the display object from view by a user.

18. The system of claim 17, further comprising means for receiving a gesture from a user.

19. The system of claim 17, wherein the three dimensional space comprises a two dimensional image of a three dimensional scene represented on a display.

20. The system of claim 17, wherein the first location comprises a background location within the three dimensional space and the second location comprises a foreground location within the three dimensional space.

21. The system of claim 17, wherein the display object has a shape similar to the window.

22. The system of claim 17, wherein the moving means comprises means for orienting the display object within the three dimensional space.

23. An apparatus for providing a generalized three dimensional windowing system in a graphical user interface comprising:

a window deactivator to deactivate a window by capturing pixels of the window and by applying the captured pixels as a texture to a display object corresponding to the window, the display object being a three dimensional geometric model in a three dimensional space; and a window activator to activate the window by moving the display object to a second location in the three dimensional space, by displaying the window over the display object thereby hiding the display object from view by a user.

24. The apparatus of claim 23, wherein the window deactivator further comprises means for animating the display object to a first location in the three dimensional space.

25. The apparatus of claim 23, wherein the first location comprises a background location within the three dimensional space and the second location comprises a foreground location within the three dimensional space.

* * * * *

UNITED STATES PATENT AND TRADEMARK OFFICE
CERTIFICATE OF CORRECTION

PATENT NO. : 6,229,542 B1
DATED : May 8, 2001
INVENTOR(S) : Miller

Page 1 of 1

It is certified that error appears in the above-identified patent and that said Letters Patent is hereby corrected as shown below:

<u>Column 3,</u>
Line 20, delete "plane 11" and insert -- plane 12 --.

Signed and Sealed this

Seventh Day of May, 2002

Attest:

JAMES E. ROGAN
*Attesting Officer*     *Director of the United States Patent and Trademark Office*